United States Patent
Yu

(10) Patent No.: US 11,963,541 B2
(45) Date of Patent: Apr. 23, 2024

(54) DEVICE AND SYSTEM FOR GENERATING LOW FREQUENCY ALTERNATING ELECTRIC FIELD, AND SIGNAL CONDITIONING METHOD

(71) Applicant: Ming Yu, Yangjiang (CN)

(72) Inventor: Ming Yu, Yangjiang (CN)

(73) Assignee: Ming Yu, Yangjiang (CN)

( * ) Notice: Subject to any disclaimer, the term of this patent is extended or adjusted under 35 U.S.C. 154(b) by 1419 days.

(21) Appl. No.: 16/309,077

(22) PCT Filed: Jan. 31, 2018

(86) PCT No.: PCT/CN2018/074824
§ 371 (c)(1),
(2) Date: Dec. 11, 2018

(87) PCT Pub. No.: WO2018/161746
PCT Pub. Date: Sep. 13, 2018

(65) Prior Publication Data
US 2019/0124956 A1    May 2, 2019

(30) Foreign Application Priority Data
Mar. 8, 2017   (CN) .......................... 201710136695.X

(51) Int. Cl.
*A23L 3/32* (2006.01)
*A23B 4/015* (2006.01)
(Continued)

(52) U.S. Cl.
CPC ................. *A23L 3/32* (2013.01); *A23B 4/015* (2013.01); *A23B 7/015* (2013.01); *H01F 27/42* (2013.01); *H05B 6/48* (2013.01); *A23V 2002/00* (2013.01)

(58) Field of Classification Search
CPC ............. H01F 27/42; A23B 4/015; A23L 3/32
See application file for complete search history.

(56) References Cited

U.S. PATENT DOCUMENTS

| 5,713,266 | A | * | 2/1998 | Ceccarani | .............. A23C 19/14 99/452 |
| 6,138,555 | A | * | 10/2000 | Hata | ......................... A23L 3/32 363/52 |

(Continued)

FOREIGN PATENT DOCUMENTS

| CN | 103219897 A | 7/2013 |
| CN | 103904559 A | 7/2014 |

(Continued)

OTHER PUBLICATIONS

PCT International Search Report and Written Opinion, PCT/CN2018/074824, dated Apr. 18, 2018.

(Continued)

*Primary Examiner* — Sean M Michalski
(74) *Attorney, Agent, or Firm* — TraskBritt

(57) ABSTRACT

Provided are a device and system for generating a low frequency alternating electric field, and a signal regulating method. The device for generating a low frequency alternating electric field includes: a direct current power supply module, an input control module, a transformer, an output control module, and a discharge module. An output end of the direct current power supply module is coupled with an input end of the input control module. An output end of the input control module is coupled with a primary side winding of the transformer, one end of a secondary side winding of the transformer is coupled with an input end of the output control module, an output end of the output control module is coupled with the discharge module, and the other end of the secondary side winding of the transformer is coupled with a ground equipotential point.

13 Claims, 3 Drawing Sheets

(51) Int. Cl.
*A23B 7/015* (2006.01)
*H01F 27/42* (2006.01)
*H05B 6/48* (2006.01)

(56) References Cited

U.S. PATENT DOCUMENTS

| | | | |
|---|---|---|---|
| 9,681,677 B2* | 6/2017 | Goto | F25D 13/00 |
| 10,582,717 B2* | 3/2020 | Goto | A23L 3/32 |
| 10,729,161 B2* | 8/2020 | Goto | F25D 13/00 |
| 2005/0180183 A1 | 8/2005 | Price et al. | |
| 2016/0015076 A1* | 1/2016 | Goto | H01F 27/29 99/451 |
| 2017/0258117 A1* | 9/2017 | Goto | H01F 27/29 |
| 2017/0311636 A1* | 11/2017 | Goto | A23L 3/32 |
| 2018/0358175 A1* | 12/2018 | Popek | H01F 27/40 |
| 2019/0124956 A1* | 5/2019 | Yu | A23L 3/32 |
| 2019/0380363 A1* | 12/2019 | Yu | A23L 3/32 |
| 2020/0383355 A1* | 12/2020 | Godai | A23B 4/015 |
| 2021/0152173 A1* | 5/2021 | Yee | H01F 27/24 |
| 2021/0166866 A1* | 6/2021 | Mikhael | H01F 27/42 |
| 2022/0320909 A1* | 10/2022 | Nakayashiki | B60L 53/126 |
| 2023/0099623 A1* | 3/2023 | Balabolin | A01N 1/0284 426/231 |

FOREIGN PATENT DOCUMENTS

| | | |
|---|---|---|
| CN | 104486898 A | 4/2015 |
| CN | 106213116 A | 12/2016 |
| CN | 106359527 A | 2/2017 |
| CN | 106712532 A | 5/2017 |
| CN | 106856374 A | 6/2017 |
| CN | 206498333 U | 9/2017 |
| CN | 206533289 U | 9/2017 |
| JP | H11-313652 A | 11/1999 |
| KR | 10-2008-0003133 A | 1/2008 |
| WO | 2018/161746 A1 | 9/2018 |

OTHER PUBLICATIONS

Chinese First Office Action for Chinese Application No. 201710136695. X, dated Feb. 25, 2023, 10 pages with translation.
Chinese Second Office Action for Chinese Application No. 201710136695.X, dated Sep. 16, 2023, 6 pages with translation.

* cited by examiner

DEVICE AND SYSTEM FOR GENERATING LOW FREQUENCY ALTERNATING ELECTRIC FIELD, AND SIGNAL CONDITIONING METHOD

CROSS-REFERENCE TO RELATED APPLICATIONS

This application is a national phase entry under 35 U.S.C. § 371 of International Patent Application PCT/CN2018/074824, filed Jan. 31, 2018, designating the United States of America and published as International Patent Publication WO 2018/161746 A1 on Sep. 13, 2018, which claims the benefit under Article 8 of the Patent Cooperation Treaty to Chinese Patent Application Serial No. 201710136695.X, filed Mar. 8, 2017, with the Chinese Patent Office, entitled "Low Frequency Alternating Electric Field Generating Device, Low Frequency Alternating Electric Field Generating System, and Signal Regulating Method," the disclosure of each of which is hereby incorporated herein in its entirety by this reference.

TECHNICAL FIELD

The present disclosure relates to the field of biomass preservation equipment, particularly to a low frequency alternating electric field generating device and system (i.e., a device and a system for generating a low frequency alternating electric field), and a signal regulating method.

BACKGROUND

With the development and improvement of science and technology, the electric power technology has been applied to the field of biomass preservation. When energized by static electricity or placed in a static electric field, food or agricultural products can achieve better preservation effects.

In the prior art, biomass may be placed in a container made of an electrically conductive material, and the container is placed on a metal bench energized by an electrostatic power supply, in order to acquire a preservation effect. However, since the preservation bench and storage and preservation facility in this technology both need excellent insulating properties so as to ensure use safety of high voltage, production costs and use and maintenance costs of this technology are extremely high. Besides, it is also feasible to form a high voltage electrostatic field between positive and negative discharge plates in order to achieve the preservation effect for the biomass placed therebetween. However, this technology also faces cost and safety problems of insulation facility. Meanwhile, under a high voltage, cell membranes of raw material tissues of the preserved biomass are likely to be broken down by the high voltage, then after the preservation treatment is removed, deterioration will be accelerated. In addition, the prior art still requires a high technical level for power equipment, thus convenience of practical use thereof is severely constrained.

Therefore, how to effectively reduce the production costs and the use and maintenance costs of the equipment while effectively improving the preservation effect, and how to improve the convenience of practical use thereof are currently major problems in the industry.

BRIEF SUMMARY

In view of this, an object of the present disclosure is to provide a low frequency alternating electric field generating device, a low frequency alternating electric field generating system, and a signal regulating method, so as to overcome the above defects.

Embodiments of the present disclosure are implemented as follows:

According to a first aspect, an embodiment of the present disclosure provides a low frequency alternating electric field generating device, wherein the low frequency alternating electric field generating device includes: a direct-current power module, an input control module, a transformer, an output control module, and a discharge module. An output end of the direct-current power module is coupled to an input end of the input control module, an output end of the input control module is coupled to a primary winding of the transformer, one end of a secondary winding of the transformer is coupled to an input end of the output control module, an output end of the output control module is coupled to the discharge module, and the other end of the secondary winding of the transformer is coupled to a ground equipotential point. The direct-current power module is configured to output to the input control module a direct-current signal generated to be matched with the input control module. The input control module is configured to generate a first low frequency signal according to a type of a preserved biomass and the acquired direct-current signal, and output the first low frequency signal to the primary winding of the transformer. The output control module is configured to acquire a second low frequency signal output through the secondary winding of the transformer, and adjust a value of current of the second low frequency signal according to the type of the preserved biomass, so as to output the adjusted second low frequency signal to the discharge module, such that the discharge module generates a low frequency alternating electric field according to the second low frequency signal.

Further, the input control module is an inverting control module; an output end of the inverting control module is coupled to the input end of the input control module, and the inverting control module is coupled to the primary winding of the transformer. The inverting control module is configured to generate a step-up first low frequency signal according to the type of the preserved biomass and the acquired direct-current signal, and output the first low frequency signal to the primary winding of the transformer, wherein the first low frequency signal is a sine wave, a cosine wave, a square wave, a rectangular wave, a trapezoidal wave, or a sawtooth wave.

Further, the direct-current power module is a non-rechargeable power supply, a rechargeable power supply, a direct-current generator, or a power adapter.

Further, the low frequency alternating electric field generating device further includes: a protection module, which is coupled to the other end of the secondary winding of the transformer and the ground equipotential point, respectively.

Further, the end of the protection module coupled to the ground equipotential point is coupled to the output end of the direct-current power module through a feeder line.

Further, the low frequency alternating electric field has a voltage intensity of 500 volts to 5000 volts across an electrode of the discharge module.

Further, the discharge module is made of an electrically conductive material, an outer surface of the discharge module is covered with an insulation material, and the discharge module is in a plate-like shape, a strip-like shape, a column-like shape or a net-like shape.

Further, the second low frequency signal has a current intensity of 0.0001 A to 0.15 A.

According to a second aspect, an embodiment of the present disclosure provides a signal regulating method, applied to the low frequency alternating electric field generating device, the low frequency alternating electric field generating device includes: a direct-current power module, an input control module, a transformer, an output control module, and a discharge module. An output end of the direct-current power module is coupled to an input end of the input control module, an output end of the input control module is coupled to a primary winding of the transformer, one end of a secondary winding of the transformer is coupled to an input end of the output control module, an output end of the output control module is coupled to the discharge module, and the other end of the secondary winding of the transformer is coupled to a ground equipotential point. The method includes: the direct-current power module outputting to the input control module a direct-current signal generated to be matched with the input control module. The input control module generating a first low frequency signal according to a type of a preserved biomass and the acquired direct-current signal, and outputting the first low frequency signal to the primary winding of the transformer. The output control module acquiring a second low frequency signal output through the secondary winding of the transformer, and adjusting a value of current of the second low frequency signal according to the type of the preserved biomass, so as to output the adjusted second low frequency signal to the discharge module, such that the discharge module generates a low frequency alternating electric field according to the second low frequency signal.

According to a third aspect, an embodiment of the present disclosure provides a low frequency alternating electric field generating system, wherein the low frequency alternating electric field generating system includes: a controller and the low frequency alternating electric field generating device, and the controller is coupled to the low frequency alternating electric field generating device.

The embodiments of the present disclosure have following beneficial effects:

The direct-current power module can output the generated direct-current signal adapted to the input control module to the input control module according to use requirements of the low frequency alternating electric field generating device. The input control module can generate the first low frequency signal corresponding to the type of the preserved biomass according to the type of the preserved biomass and the acquired direct-current signal, and output the first low frequency signal to the primary winding of the transformer. Through the electromagnetic coupling relationship between the primary winding and the secondary winding, the transformer, according to the first low frequency signal of the primary winding, can output the second low frequency signal to the output control module by the secondary winding. The output control module also can adjust the value of current of the second low frequency signal according to the type of the preserved biomass, so as to output to the discharge module the second low frequency signal adjusted to be corresponding to the type of the preserved biomass, such that the discharge module generates in the space the low frequency alternating electric field according to the second low frequency signal. The low frequency alternating electric field can enable water molecules in the preserved biomass placed in the low frequency alternating electric field to swing at a same frequency, so as to effectively suppress biochemical reaction and metabolism inside the preserved biomass, thus increasing a freezing speed of the preserved biomass in a low-temperature environment and effectively reducing energy consumption and time consumption while serving good preservation effect to the preserved biomass. In addition, since the characteristics of the low frequency alternating electric field can correspond to the type of the preserved biomass, the low frequency alternating electric field can exert relatively good preservation effects on various preserved biomasses. Moreover, since the direct-current power module is used as a power input, the volume of the low frequency alternating electric field generating device can be effectively reduced while having relatively strong use convenience, such that the low frequency alternating electric field generating device is miniaturized, facilitating movement, use or installation, therefore, it is applicable to an extremely broad scope.

Other features and advantages of the present disclosure will be illustrated in following description, and will partially become obvious from the description, or understood by implementing the embodiments of the present disclosure. The objects and other advantages of the present disclosure may be achieved and obtained through the structures specifically indicated in the description, the claims, and the accompanying drawings.

BRIEF DESCRIPTION OF THE DRAWINGS

In order to more clearly illustrate embodiments of the present disclosure or technical solutions in the prior art, the accompanying drawings that are needed for description of the embodiments or the prior art will be introduced briefly below. Apparently, the accompanying drawings in the description below are merely for some embodiments of the present disclosure. A person ordinarily skilled in the art still can obtain other relevant drawings in light of these accompanying drawings, without paying inventive effort. From the accompanying drawings, the above and other objects, features, and advantages of the present disclosure will become clearer. The same reference signs refer to the same parts throughout the accompanying drawings. The accompanying drawings are not intentionally scaled or drawn according to an actual size, with the emphasis of showing the gist of the present disclosure.

Reference signs: 200—low frequency alternating electric field generating system; 210—controller; 100—low frequency alternating electric field generating device; 110— direct-current power module; 120—input control module; 130—protection module; 140—output control module; 150—discharge module.

DETAILED DESCRIPTION

In order to make the objects, technical solutions, and advantages of the embodiments of the present disclosure clearer, the technical solutions in the embodiments of the present disclosure will be described clearly and completely below in conjunction with the accompanying drawings in the embodiments of the present disclosure, apparently, some but not all embodiments of the present disclosure are described. Generally, components in the embodiments of the present disclosure, described and shown in the accompanying drawings herein, may be arranged and designed in different configurations.

Therefore, the following detailed description of the embodiments of the present disclosure provided in the accompanying drawings is not intended to limit the scope of protection of the present disclosure, but merely represents chosen embodiments of the present disclosure. On the basis of the embodiments of the present disclosure, all of other embodiments, obtained by a person ordinarily skilled in the art without paying inventive effort, should fall within the scope of protection of the present disclosure.

It should be noted that similar reference signs and letters represent similar items in the following accompanying drawings, therefore, once a certain item is defined in one accompanying drawing, it does not need to be further defined or explained in subsequent accompanying drawings.

In the description of the present disclosure, it also should be indicated that unless otherwise specified and defined explicitly, terms "connect" or "couple" should be construed in a broad sense. For example, it may be fixed connection, detachable connection, or integral connection; it may be mechanical connection, and also may be electrical connection; it may be direct connection, indirect connection through an intermediate medium, or inner communication between two elements. For a person ordinarily skilled in the art, specific meanings of the above-mentioned terms in the present disclosure can be understood according to specific circumstances.

Figure 1:
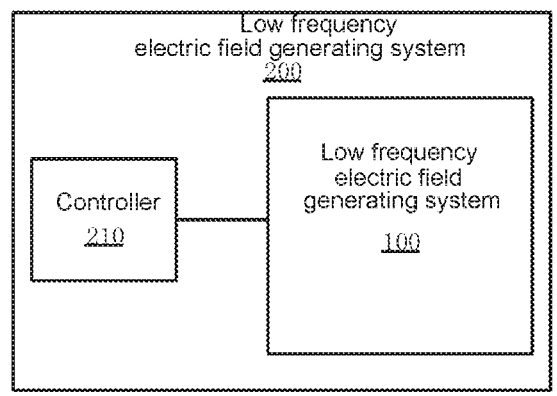
FIG. 1 shows a structural block diagram of a low frequency alternating electric field generating system provided in an embodiment of the present disclosure.

Referring to FIG. 1, an embodiment of the present disclosure provides a low frequency alternating electric field generating system 200, and the low frequency alternating electric field generating system 200 includes: a controller 210 and a low frequency alternating electric field generating device 100.

The controller 210 may be an integrated circuit chip, which has a signal processing function, wherein the controller 210 may be a general-purpose processor, including a Central Processing Unit ("CPU" for short), a Network Processor ("NP" for short), etc., and also may be a digital signal processor (DSP), an application-specific integrated circuit (ASIC), a Field Programmable Gate Array (FPGA) or other programmable logic devices, a discrete gate or a transistor logic device, or a discrete hardware component. Various methods, steps, and logic blocks disclosed in the embodiments of the present disclosure can be implemented or executed. The general-purpose processor may be a microprocessor or the processor may be any conventional processor and so on.

The controller 210 per se may have certain data storage capacity, so as to store operation data required when the low frequency alternating electric field generating system 200 preserves various types of preserved biomass. In addition, the controller 210 may be provided with an input unit such as a knob, a button, or a touch screen. The controller 210 may be coupled to the low frequency alternating electric field generating device through a data bus, for example, through a 232 bus, a 485 bus, or a controller 210 controller area network (CAN) and the like. In the present embodiment, according to the type of biomass to be preserved, an operator inputs an operation instruction corresponding to the type of the preserved biomass by manipulating the input unit such as the knob, the button or the touch screen on the controller 210, wherein the preserved biomass may include: food, agricultural products, bio-derived materials, and so on. The controller 210 can select operation data corresponding to the operation instruction according to the operation instruction. Then the controller 210 generates a corresponding control instruction according to the operation data, and outputs the control instruction to the low frequency alternating electric field generating device 100 through the data bus, so as to control the operation of the low frequency alternating electric field generating device 100 through the control instruction.

The low frequency alternating electric field generating device 100 is coupled to the controller 210 through the data bus, so as to receive the control instruction input by the controller 210. The low frequency alternating electric field generating device 100 can adjust a current and a frequency of an electric signal generating the low frequency alternating electric field according to the control instruction, so as to generate the low frequency alternating electric field required by the corresponding type of the preserved biomass, and further enable different types of preserved biomass to achieve best preservation effects through the low frequency alternating electric field generating device 100. Besides, the low frequency alternating electric field generating device 100 is further provided with an operation button or knob, such that the operator also can conveniently adjust the current and the frequency of the electric signal generating the low frequency alternating electric field by manually adjusting the button or knob, so as to generate the low frequency alternating electric field required by the corresponding type of the preserved biomass.

Figure 2:
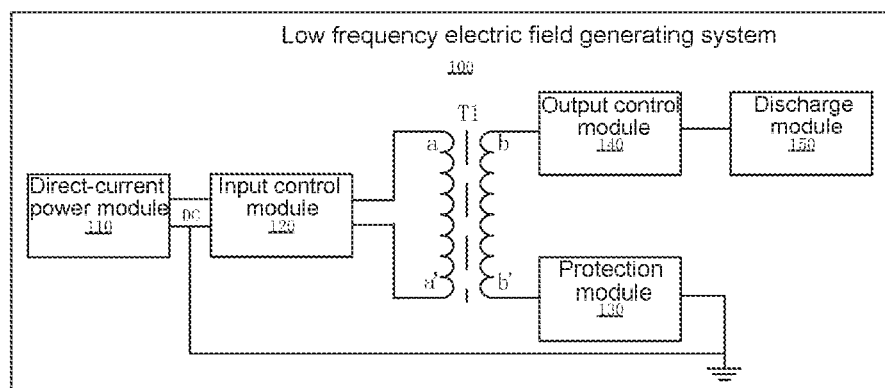
FIG. 2 shows a structural block diagram of a low frequency alternating electric field generating device provided in an embodiment of the present disclosure.

Referring to FIG. 2, an embodiment of the present disclosure provides a low frequency alternating electric field generating device 100, and the low frequency alternating electric field generating device 100 includes: a direct-current power module 110, an input control module 120, a transformer T1, a protection module 130, an output control module 140, and a discharge module 150.

The direct-current power module 110 is configured to generate a direct-current signal matched with the input control module 120 according to electric energy stored, generated, or converted, and output the direct-current signal to the input control module 120. In the above, the direct-current power module 110 may be: a non-rechargeable power supply, a rechargeable power supply, a direct-current generator, or a power adapter.

The input control module 120 is configured to acquire the direct-current signal input by the direct-current power module 110. The input control module 120 generates a step-up first low frequency signal through its own inverting circuit according to the type of the preserved biomass and the direct-current signal, and outputs the first low frequency signal to a primary winding aa' of the transformer T1. In the present embodiment, by providing an input unit such as a knob, a button, or a touch screen to the input control module 120 itself, the operator may input the control instruction corresponding to the type of the preserved biomass, such that the input control module 120 generates the first low frequency signal according to the control instruction and the direct-current signal.

The transformer T1 is configured to, through an electromagnetic coupling relationship between the primary winding aa' and a secondary winding bb' thereof, step up (step down) the first low frequency signal input to the primary winding aa', and then output the step-up (step-down) first low frequency signal through the secondary winding bb' thereof to the output control module 140.

The protection module 130 is configured to ensure normal operation of the low frequency alternating electric field generating device 100 through grounding, and forms overcurrent or overvoltage protection for the low frequency alternating electric field generating device 100, wherein the protection module 130 may be a protection resistor or a protection capacitor.

The output control module 140 is configured to acquire a second low frequency signal output through the secondary winding bb' of the transformer T1, adjust a value of current of the second low frequency signal according to the type of the preserved biomass, and further adjust an output power output by itself to the discharge module 150. In the present embodiment, the operator also may input the control instruction corresponding to the type of the preserved biomass by providing an input unit such as a knob, a button, or a touch screen on the output control module 140 itself, such that the input control module 120 adjusts the value of current of the second low frequency signal according to the control instruction.

The discharge module 150 is configured to generate the low frequency alternating electric field in a space according to the second low frequency signal received, wherein the discharge module 150 may include one or more discharge plates.

As illustrated in FIG. 2, the direct-current power module 110 is configured to provide electric energy for the normal operation of the low frequency alternating electric field generating device 100. In the present embodiment, the direct-current power module 110 may be: a non-rechargeable power supply, a rechargeable power supply, a direct-current generator, or a power adapter. A practical type of the direct-current power module 110 may be selected according to a practical application environment of the low frequency alternating electric field generating device 100.

In an embodiment, if a special environment where the low frequency alternating electric field generating device 100 is applied causes it necessary to change the direct-current power module 110 in each time of use, the direct-current power module 110 may be a non-rechargeable power supply. According to requirements of practical application, the direct-current power module 110 may be a disposable battery, and also may be constituted by connecting multiple disposable batteries in series or in parallel, so as to generate the direct-current signal required by the low frequency alternating electric field generating device 100. If the low frequency alternating electric field generating device 100 needs to ensure operation stability and prolong operation time, the direct-current power module 110 may be a rechargeable power supply. That is, it may be a rechargeable lithium battery, for example, a storage battery or a charge pal (mobile power supply, power bank). According to requirements of practical application, the direct-current power module 110 may be a single storage battery or a single charge pal, and also may be constituted by connecting multiple storage batteries in series or in parallel, or may be constituted by connecting multiple charge pals in series or in parallel, so as to generate the direct-current signal required by the low frequency alternating electric field generating device 100. In a power supplying state, the rechargeable effect of the direct-current power module 110 can provide the electric energy to ensure the normal operation of the low frequency alternating electric field generating device 100 while the direct-current power module 110 is being recharged to store energy. In a power-off state, the direct-current power module 110 can provide the electric energy stored in itself to ensure that the low frequency alternating electric field generating device 100 still can carry out the normal operation in a relatively long period of time. If the low frequency alternating electric field generating device 100 needs to generate electric energy by itself, the direct-current power module 110 may be a direct-current generator. The direct-current power module 110 may generate the direct-current signal required by the low frequency alternating electric field generating device 100 by converting other energies. For example, the direct-current power module 110 per se may be a direct-current generator, and also may be a vehicle-mounted power supply. If a practical application environment of the low frequency alternating electric field generating device 100 causes it necessary to convert the electric energy, the direct-current power module 110 also may be a power adapter. A model of the power adapter may be selected according to a magnitude of the direct-current signal required by the low frequency alternating electric field generating device 100.

In the present embodiment, an output end of the direct-current power module 110 has positive and negative electrodes, and the positive and negative electrodes of the output end of the direct-current power module 110 are both correspondingly coupled to an input end of the input control module 120 through a lead. The direct-current power module 110, after generating the direct-current signal according to the electric energy stored, generated, or converted by itself, can output the direct-current signal to the input control module 120. According to the practical application requirement of the low frequency alternating electric field generating device 100, the direct-current signal output by the direct-current power module 110 may have a voltage of 5V to 24V. Besides, due to properties of the direct-current power module 110 itself, the power it outputs is relatively small, then the low frequency alternating electric field generating device 100 can be miniaturized, so as to facilitate movement, use or installation, therefore, an application range of the low frequency alternating electric field generating device 100 is extremely increased.

The input control module 120 may be an inverting control module, the input end of the input control module 120 is coupled to the output end of the direct-current power module 110, the output end of the input control module 120 is coupled to the primary winding of the transformer T1, that is, an input end of the inverting control module may be coupled to the output end of the direct-current power module 110, and an output end of the inverting control module may be coupled to the primary winding of the transformer T1.

The input control module 120 is an inverting control module, therefore, the input control module 120 can form the first low frequency signal by inverting and stepping up the direct-current signal according to the type of the preserved biomass, and then output the first low frequency signal to the primary winding aa' of the transformer T1. Specifically, the input control module 120 may include: an inverting bridge circuit, a control logic circuit, and a filter circuit. The inverting bridge circuit can be coupled to the direct-current power module 110 and the filter circuit respectively through a power line, the control logic circuit controls the inverting bridge circuit in a manner of being coupled to the inverting bridge circuit through a power line, and the filter circuit is coupled to the primary winding aa' of the transformer T1 through a power line. In addition, the input control module 120 further may be provided with an input unit such as a knob, a button, or a touch screen. After the input control module 120 is coupled to the direct-current power module 110 through the power line, the inverting bridge circuit thereof can step up and invert the direct-current signal into the first low frequency signal of alternating current. In the present embodiment, the operator may input the control instruction corresponding to the type of the preserved biomass to the control logic circuit through the input unit such as the knob, the button, or the touch screen on the input control module 120. Besides, the control logic circuit also may receive the control instruction input by the controller in a manner of being coupled to the controller. It should be indicated that the manner of acquiring the control instruction by the control logic circuit also may depend on a practical implementation situation, and it is not defined herein. The control logic circuit can correspondingly control the inverting bridge circuit according to the control instruction acquired. Through the control of the control logic circuit over the inverting bridge circuit, a waveform of the first low frequency signal generated through the inversion of the inverting bridge circuit includes: sine wave, cosine wave, square wave, rectangular wave, trapezoidal wave, or sawtooth wave and so on, and the first low frequency signal has a frequency of 1 HZ to 300 kHZ. The input control module 120 filters the first low frequency signal through the filter circuit thereof, so as to remove an interference signal in the first low frequency signal, and then output the filtered first low frequency signal to the primary winding aa' of the transformer T1.

The input control module 120 performs inversion for the direct-current signal, and can serve a function of controlling a frequency and a waveform of the low frequency alternating electric field. Besides, the input control module 120, as a primary step-up device of the low frequency alternating electric field generating device 100, steps up the direct-current signal to a certain extent while inverting the direct-current signal, and the step-up can effectively reduce a transformer ratio of the transformer T1, such that a volume of the low frequency alternating electric field generating device 100 is effectively reduced while a volume of the transformer T1 is reduced, further enhancing the miniaturization of the low frequency alternating electric field generating device 100, so as to facilitate movement, use, or installation.

The primary winding aa' of the transformer T1 is coupled to the input end of the input control module 120 through a power line, such that the primary winding aa' thereof can acquire the first low frequency signal. Through the electromagnetic coupling relationship between the primary winding aa' and the secondary winding bb' of the transformer T1, the first low frequency signal input to the primary winding aa' can be stepped up by the secondary winding bb' thereof to generate the second low frequency signal. In an embodiment, the transformer T1 may be an adjustable transformer T1. The operator can adjust the transformer ratio of the transformer T1 by adjusting a number of coupling turns between the primary winding aa' and the secondary winding bb' of the transformer T1, and further can adjust a voltage amplitude of the second low frequency signal. In the above, a voltage of the second low frequency signal ranges 500V-5000V. In the present embodiment, by adjusting the transformer ratio of the transformer T1, the operator also may enable the voltage of the second low frequency signal generated by the transformer T1 to be adapted to the type of the biomass to be preserved. One end of the secondary winding bb' of the transformer T1 is coupled to the protection module 130 through a power line, and the other end of the secondary winding bb' thereof is coupled to the input end of the output control module 140 through a power line.

One end of the protection module 130 is coupled to an end of the secondary winding bb' of the transformer T1, and the other end of the protection module 130 is coupled to a ground equipotential point to form a closed loop, so as to ensure that the low frequency alternating electric field generating device 100 is capable of generating the low frequency alternating electric field. In a preferred embodiment, the end of the protection module 130 coupled to the ground equipotential point is further coupled to a negative electrode of the output end of the direct-current power module 110 through a feeder line. Through the coupling in a manner of using the feeder line, the low frequency alternating electric field generating device 100 can be enabled to generate a low frequency alternating electric field with better preservation effects through the introduction of load power consumption. In the present embodiment, the protection module 130 may include: a protection resistor or a protection capacitor, and a resistance value of the resistor thereof or a capacitance of the capacitor thereof may be determined according to a practical implementation situation. If overcurrent or overvoltage occurs to the low frequency alternating electric field generating device 100, the protection module 130 can effectively share and bear an output power of the low frequency alternating electric field generating device 100 at this time, so as to avoid damage to other modules due to overcurrent or overvoltage.

The output control module 140 can effectively control and adjust an output power output by itself to the discharge module 150. Specifically, the output control module 140 also can be coupled to the other end of the secondary winding bb' of the transformer T1 through a power line, so as to acquire the second low frequency signal output by the secondary winding bb' of the transformer T1. The output control module 140 further may be provided with an input unit such as a knob, a button, or a touch screen. In the present embodiment, the operator may input the control instruction corresponding to the type of the preserved biomass to the output control module 140 by manipulating the knob, the button, or the touch screen on the output control module 140, besides, the output control module 140 also may receive the control instruction input by the controller. It should be indicated that the manner of acquiring the control instruction by the output control module 140 also may depend on a practical implementation situation, and is not defined herein.

In an embodiment, after the output control module 140 acquires the control instruction, the output control module 140 can change its own resistance value according to the control instruction, so as to correspondingly adjust a magnitude of a current of the second low frequency signal, and further adjust an output power output by itself to the discharge module 150. Of course, the adjustment in a manner using the resistance value is merely an implementation of the present solution, and other manners capable of achieving the adjustment effect are not described in detail herein. In another embodiment, the output control module 140 adjusts the current of the second low frequency signal in a range of 0.0001 A to 0.15 A. The output control module 140 is further coupled to the discharge module 150 through a power line, so as to output the second low frequency signal to the discharge module 150.

The discharge module 150 is coupled to the output control module 140 through the power line, so as to discharge in the space to generate the low frequency alternating electric field according to the received second low frequency signal. Specifically, the discharge module 150 may be an electrode plate. In order to ensure use safety, an outer surface of the discharge module 150 is fully covered with an insulation material. After acquiring the second low frequency signal, the discharge module 150, due to its own electrically conductive function, can induce the alternated low frequency alternating electric field within an environment space of operation in a continuous and stable manner according to the second low frequency signal. Besides, the discharge module 150 may have a plate-like shape, a strip-like shape, a column-like shape or a net-like shape and so on, and a specific shape thereof may be dependent on a practical application site thereof, and is not defined herein. Furthermore, according to the practical application environment, the discharge module 150 further may be in multiple, and each discharge module 150 is coupled to the output control module 140 through a power line, such that multiple discharge modules 150 are in parallel connection. After the multiple discharge modules 150 are able to be connected in parallel, the preservation effect of the low frequency alternating electric field generating device 100 to the preserved biomass can be effectively improved. Besides, the discharge module 150 is relatively distant from the ground equipotential point in the low frequency alternating electric field generating device 100, such that a space potential of the low frequency alternating electric field has a small variation value increased with distance. Weak electric field attenuation within a short distance can further render good preservation effects for the preserved biomasses placed in different positions in the low frequency alternating electric field. Furthermore, since the output control module 140 adjusts current intensity of the second low frequency signal, the discharge module 150 may have a voltage intensity of 500 volts to 5000 volts across discharge electrodes thereof.

In the present embodiment, when the low frequency alternating electric field generating device 100 generates a low frequency alternating electric field in the space, the low frequency alternating electric field can enable water molecules in the preserved biomass placed in the low frequency alternating electric field to swing at a same frequency, so as to effectively suppress biochemical reaction and metabolism inside the preserved biomass, thus exerting good preservation effects on the preserved biomass. Besides, if the low frequency alternating electric field generating device 100 generating the low frequency alternating electric field in the space is applied to a low-temperature quick-freezing device, the low frequency alternating electric field can enable the water molecules in the preserved biomass to generate ice crystals with a smaller volume, which can effectively accelerate a freezing speed of the preserved biomass (for example, by 30% or more) while achieving a good preservation effect, further remarkably improving the quality of a quick-frozen product while saving time and energy.

Figure 3:
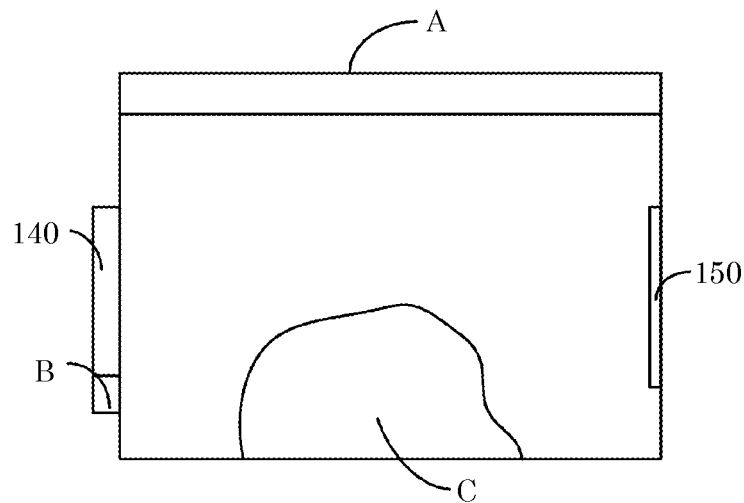
FIG. 3 shows a schematic diagram of a first application environment of the low frequency alternating electric field generating device provided in an embodiment of the present disclosure.
Figure 4:
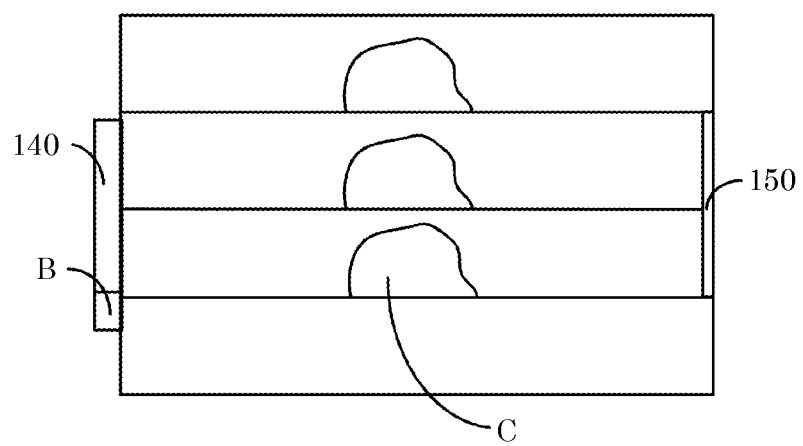
FIG. 4 shows a schematic diagram of a second application environment of the low frequency alternating electric field generating device provided in an embodiment of the present disclosure.
Figure 5:
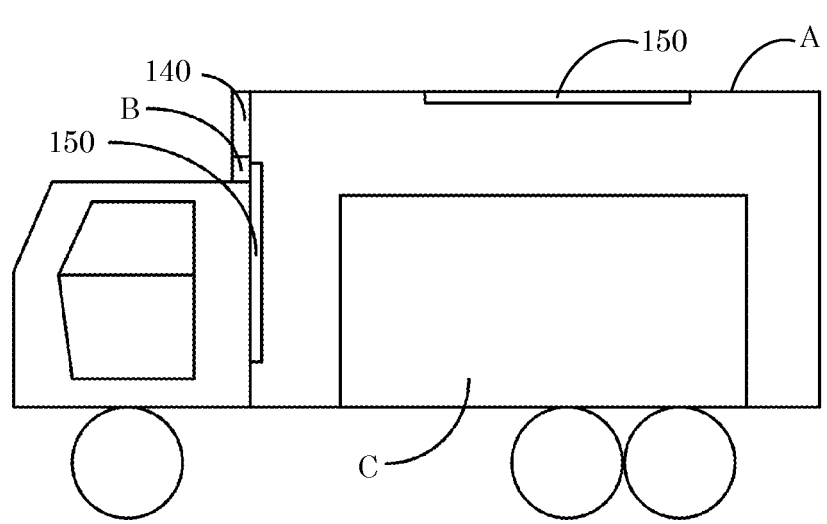
FIG. 5 shows a schematic diagram of a third application environment of the low frequency alternating electric field generating device provided in an embodiment of the present disclosure.

Referring to FIG. 3, FIG. 4, and FIG. 5, all of FIG. 3, FIG. 4, and FIG. 5 show practical application of the low frequency alternating electric field generating device 100.

FIG. 3 shows application of the low frequency alternating electric field generating device 100 in a portable refrigerator, A in the drawing is a refrigerator body, and there is a cover over the refrigerator body. B in the drawing is an equipotential point of the low frequency alternating electric field generating device 100. C in the drawing is a preserved biomass placed in the refrigerator. FIG. 4 shows application of the low frequency alternating electric field generating device 100 in a movable display cabinet in a market, A in the drawing is a display cabinet body, and there are multiple compartments inside the display cabinet body. B in the drawing is an equipotential point of the low frequency alternating electric field generating device 100. C in the drawing is a preserved biomass placed on a partition of the display cabinet. FIG. 5 shows application of the low frequency alternating electric field generating device 100 in an automobile transporting a preserved biomass, A in the drawing is a transport case of the automobile. B in the drawing is an equipotential point of the low frequency alternating electric field generating device 100, wherein the electrode plate of the discharge module 150 is in multiple. C in the drawing is the preserved biomass placed in the transport case.

Referring to FIG. 3, FIG. 4, and FIG. 5, the low frequency alternating electric field generating device 100 provided in the present embodiment, powered by a direct current and having no grounding electrode, can be particularly adapted to installation in a moving environment, or used in a low-temperature preservation device or a quick-freezing device without a grounding condition. For example, an automobile refrigerator, a hand-held preservation box, a refrigeration or freezing transport vehicle, a refrigeration or freezing container. In use, the low frequency alternating electric field generating device 100 is installed outside the low-temperature preservation device or the quick-freezing device, then the discharge module 150 is installed inside the low-temperature preservation device or the quick-freezing device, therefore, through the low frequency alternating electric field generated by the low frequency alternating electric field generating device 100 through the discharge module 150 can enable the preserved biomass inside the low-temperature preservation device or the quick-freezing device to achieve ideal preservation or quick-freezing effect. Furthermore, through the adjustment to the low frequency alternating electric field generating device 100, a plurality of types of preserved biomass, for example, a plurality of types of food, agricultural products, and other biological materials, can be preserved and quick frozen.

Experiment data of the low frequency alternating electric field generating device 100 provided in the present embodiment is as follows:

Cherries usually have a shelf life of 2-3 days when perseverved by a conventional storage means at a low temperature of 0-4° C. But when cherries are placed in a low frequency alternating electric field at a low temperature of 0-4° C., and an electric potential at a position where the cherries are placed is 100V, the shelf life of the cherries is prolonged to be 8-10 days, and a rate of good fruit of the cherries may be kept at 95% or above.

Lettuce usually has a shelf life of 3 days when perseverved by a conventional storage means at 10° C. But when lettuce is placed in a low frequency alternating electric field at 0-10° C., and an electric potential at a position where the lettuce is placed is 100V, the shelf life of the lettuce is prolonged to be about 7 days. Moreover, the lettuce within the shelf life is saturated with moisture and has no rotten leaves.

Pork merely has a shelf life of 2-4 days when perseverved by a conventional storage means at a temperature of 0-4° C. But when pork is placed in a low frequency alternating electric field at an environment temperature of 0-4° C., and an electric potential at a position where the pork is placed is 150V, the shelf life of the pork may be up to 12-15 days, moreover, in the low frequency alternating electric field generating device 100, the pork within the shelf life is fresh and cool and not sticky on the surface, has no undesirable odor, and maintains distinct original colors of red and white.

*Trachinotus ovatus* caught should be stored at 0° C. in the presence of ice when preserved by a conventional storage means, and has a shelf life of no more than 72 hours, otherwise, it will spoil to be non-edible. But when it is placed in a low frequency alternating electric field at an environment temperature of 0-4° C., and an electric potential at a position where the *trachinotus ovatusis* placed is 300V, its shelf life may be up to 8-10 days. Moreover, in the low frequency alternating electric field generating device 100, the *trachinotus ovatus* within the shelf life is bright and shining on the surface, and has no undesirable odor, and a total number of microorganism colonies is not changed significantly, but remains within a range of $6.8\times10^3$ to $5.3\times10^4$.

When the low frequency alternating electric field generating device 100 is installed in a quick-freezing device, the low frequency alternating electric field generated by the low frequency alternating electric field generating device 100 can save least ⅓ or more of the quick-freezing time. For example, when the conventional quick freezing at a temperature of −35° C. is used, it takes about 6 hours to quick-freeze a whole dressed chicken of 1.5 kg in a blast manner. But after the low frequency alternating electric field generating device 100 is installed, and the discharge module 150 has a voltage of 300V across the electrode plate thereof, under a quick freezing condition of −35° C., the time for quick-freezing a whole dressed chicken of 1.5 kg in a blast manner can be reduced to 3.5-4 hours. Moreover, the effect of the low frequency alternating electric field can achieve 1.5% or less of a rate of juice leakage of quick-frozen dressed chicken, which is far less than about 5% of a rate of juice leakage of dressed chicken quick-frozen in a conventional manner, therefore, the low frequency alternating electric field generating device 100 can render better product quality of thawed chicken, and meanwhile also greatly reduce the processing loss.

Figure 6:
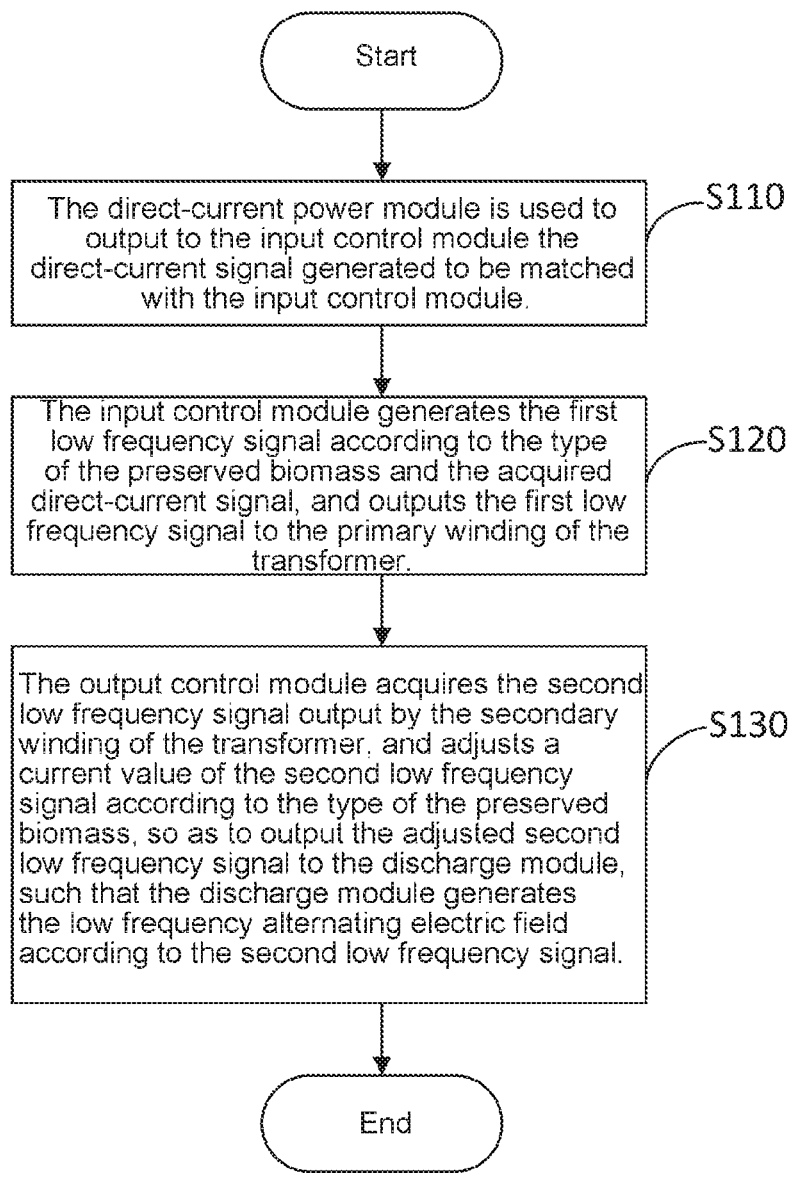
FIG. 6 shows a flowchart of a signal regulating method provided in an embodiment of the present disclosure.

Referring to FIG. 6, an embodiment of the present disclosure further provides a signal regulating method, which is applied to the low frequency alternating electric field generating device, and the signal regulating method includes: Step S110, Step S120, and Step S130.

Step S110: the direct-current power module is configured to generate the direct-current signal matched with the input control module and output the direct-current signal to the input control module.

Step S120: the input control module generates the first low frequency signal according to the type of the preserved biomass and the acquired direct-current signal, and outputs the first low frequency signal to the primary winding of the transformer.

Step S130: the output control module acquires the second low frequency signal output by the secondary winding of the transformer, and adjusts a value of current of the second low frequency signal according to the type of the preserved biomass, so as to output the adjusted second low frequency signal to the discharge module, such that the discharge module generates the low frequency signal according to the second low frequency signal.

A person skilled in the art can clearly know that for the sake of descriptive convenience and conciseness, reference can be made to corresponding processes in the preceding device for specific operation processes of the method described in the above, and they will not be repeated redundantly herein.

To sum up, the embodiments of the present disclosure provide the low frequency alternating electric field generating device, the low frequency alternating electric field generating system, and the signal regulating method. The low frequency alternating electric field generating device includes: the direct-current power module, the input control module, the transformer, the output control module, and the discharge module. The output end of the direct-current power module is coupled to the input end of the input control module, the output end of the input control module is coupled to the primary winding of the transformer, one end of the secondary winding of the transformer is coupled to the input end of the output control module, the output end of the output control module is coupled to the discharge module, and the other end of the secondary winding of the transformer is coupled to the ground equipotential point.

The direct-current power module can output the generated direct-current signal adapted to the input control module to the input control module according to use requirements of the low frequency alternating electric field generating device. The input control module can generate the first low frequency signal corresponding to the type of the preserved biomass according to the type of the preserved biomass and the acquired direct-current signal, and output the first low frequency signal to the primary winding of the transformer. Through the electromagnetic coupling relationship between the primary winding and the secondary winding, the transformer, according to the first low frequency signal of the primary winding, can output the second low frequency signal to the output control module by the secondary winding. The output control module also can adjust the value of current of the second low frequency signal according to the type of the preserved biomass, so as to output to the discharge module the second low frequency signal adjusted to be corresponding to the type of the preserved biomass, such that the discharge module generates in the space the low frequency alternating electric field according to the second low frequency signal. The low frequency alternating electric field can enable water molecules in the preserved biomass placed in the low frequency alternating electric field to swing at a same frequency, so as to effectively suppress biochemical reaction and metabolism inside the preserved biomass, thus increasing a freezing speed of the preserved biomass in a low-temperature environment and effectively reducing energy consumption and time consumption while serving good preservation effect to the preserved biomass. In addition, since the characteristics of the low frequency alternating electric field can correspond to the type of the preserved biomass, the low frequency alternating electric field can exert relatively good preservation effects on various preserved biomasses. Moreover, since the direct-current power module is used as a power input, the volume of the low frequency alternating electric field generating device can be effectively reduced while having relatively strong use convenience, such that the low frequency alternating electric field generating device is miniaturized, facilitating movement, use or installation, therefore, it is applicable to an extremely broad scope.

The above-mentioned are merely for preferred embodiments of the present disclosure and not used to limit the present disclosure. For one skilled in the art, various modifications and changes may be made to the present disclosure. Any amendments, equivalent replacements, improvements, and so on, within the spirit and principle of the present disclosure, should be covered within the scope of protection of the present disclosure.

What is claimed is:

1. A generating device for generating low frequency alternating electric field, wherein the low frequency alternating electric field generating device comprises:
   a direct-current power module, an input control module, a transformer, an output control module, and a discharge module; an output end of the direct-current power module is coupled to an input end of the input control module, an output end of the input control module is coupled to a primary winding of the transformer, one end of a secondary winding of the transformer is coupled to an input end of the output control module, an output end of the output control module is coupled to the discharge module, and the other end of the secondary winding of the transformer is coupled to a ground equipotential point;
   the direct-current power module is configured to output to the input control module a direct-current signal generated to be matched with the input control module;
   the input control module is configured to include an inverting bridge circuit, a control logic circuit, and a filter circuit, wherein the input control module is configured to generate a first low frequency signal through the inverting bridge circuit according to a type of a preserved biomass and the direct-current signal, and output the first low frequency signal to the primary winding of the transformer; and
   the output control module is configured to acquire a second low frequency signal output through the secondary winding of the transformer, and adjust a value of current of the second low frequency signal according to the type of the preserved biomass, so as to output the adjusted second low frequency signal to the discharge module, such that the discharge module generates a low frequency alternating electric field according to the second low frequency signal,
   wherein the direct-current power module comprises a non-rechargeable power supply, a rechargeable power supply, a direct-current generator, or a power adapter,
   wherein the low frequency alternating electric field is in a voltage intensity of 500 volts to 5000 volts across an electrode of the discharge module, and
   wherein the discharge module is made of an electrically conductive material, an outer surface of the discharge module is covered with an insulation material, and the discharge module is in a plate-like shape, a strip-like shape, a column-like shape or a net-like shape.

2. The low frequency alternating electric field generating device according to claim 1, wherein the input control module is an inverting control module; an output end of the inverting control module is coupled to the input end of the input control module, and the inverting control module is coupled to the primary winding of the transformer; and
   the inverting control module is configured to generate a step-up first low frequency signal according to the type of the preserved biomass and the direct-current signal, and output the first low frequency signal to the primary winding of the transformer, wherein the first low frequency signal is a sine wave, a cosine wave, a square wave, a rectangular wave, a trapezoidal wave, or a sawtooth wave.

3. The low frequency alternating electric field generating device according to claim 1, wherein the low frequency alternating electric field generating device further comprises a protection module, which is coupled to the other end of the secondary winding of the transformer and the ground equipotential point, respectively.

4. The low frequency alternating electric field generating device according to claim 3, wherein the end of the protection module coupled to the ground equipotential point is coupled to the output end of the direct-current power module through a feeder line.

5. The low frequency alternating electric field generating device according to claim 1, wherein the second low frequency signal has a current intensity of 0.0001 A to 0.15 A.

6. A low frequency alternating electric field generating system, wherein the low frequency alternating electric field generating system comprises: a controller and the low frequency alternating electric field generating device according to claim 1, and the controller is coupled to the low frequency alternating electric field generating device.

7. The low frequency alternating electric field generating system according to claim 6, wherein the input control module is an inverting control module; an output end of the inverting control module is coupled to the input end of the input control module, and the inverting control module is coupled to the primary winding of the transformer; and
   the inverting control module is configured to generate a step-up first low frequency signal according to the type of the preserved biomass and the acquired direct-current signal, and output the first low frequency signal to the primary winding of the transformer, wherein the first low frequency signal is a sine wave, a cosine wave, a square wave, a rectangular wave, a trapezoidal wave, or a sawtooth wave.

8. The low frequency alternating electric field generating system according to claim 6, wherein the low frequency alternating electric field generating device further comprises a protection module, which is coupled to the other end of the secondary winding of the transformer and the ground equipotential point, respectively.

9. The low frequency alternating electric field generating system according to claim 8, wherein the end of the protection module coupled to the ground equipotential point is coupled to the output end of the direct-current power module through a feeder line.

10. The low frequency alternating electric field generating system according to claim 6, wherein the second low frequency signal has a current intensity of 0.0001 A to 0.15 A.

11. A signal regulating method, applicable to the low frequency alternating electric field generating device according to claim 1, wherein the low frequency alternating electric field generating device comprises: a direct-current power module, an input control module, a transformer, an output control module, and a discharge module; an output end of the direct-current power module is coupled to an input end of the input control module, an output end of the input control module is coupled to a primary winding of the transformer, one end of a secondary winding of the transformer is coupled to an input end of the output control module, an output end of the output control module is coupled to the discharge module, and the other end of the secondary winding of the transformer is coupled to a ground equipotential point; the method comprising:
   the direct-current power module outputting to the input control module a direct-current signal generated to be matched with the input control module;
   the input control module generating, using an inverting bridge circuit, a control logic circuit, and a filter circuit, a first low frequency signal through the inverting bridge circuit according to a type of a preserved biomass and the acquired direct-current signal, and outputting the first low frequency signal to the primary winding of the transformer; and the output control module acquiring a second low frequency signal output by the secondary winding of the transformer, and adjusting a value of current of the second low frequency signal according to the type of the preserved biomass, so as to output the adjusted second low frequency signal to the discharge module, such that the discharge module generates a low frequency alternating electric field according to the second low frequency signal, wherein the direct-current power module comprises a non-rechargeable power supply, a rechargeable power supply, a direct-current generator, or a power adapter, and wherein the low frequency alternating electric field is in a voltage intensity of 500 volts to 5000 volts across an electrode of the discharge module.

12. The signal regulating method according to claim 11, wherein the input control module is an inverting control module; an output end of the inverting control module is coupled to the input end of the input control module, and the inverting control module is coupled to the primary winding of the transformer; and the inverting control module is configured to generate a step-up first low frequency signal according to the type of the preserved biomass and the acquired direct-current signal, and output the first low frequency signal to the primary winding of the transformer, wherein the first low frequency signal is a sine wave, a cosine wave, a square wave, a rectangular wave, a trapezoidal wave, or a sawtooth wave.

13. The signal regulating method according to claim 11, wherein the low frequency alternating electric field generating device further comprises a protection module, which is coupled to the other end of the secondary winding of the transformer and the ground equipotential point, respectively.

* * * * *